May 13, 1941.     I. H. WILSEY     2,241,754
APPARATUS FOR POPPING CORN
Filed March 24, 1938
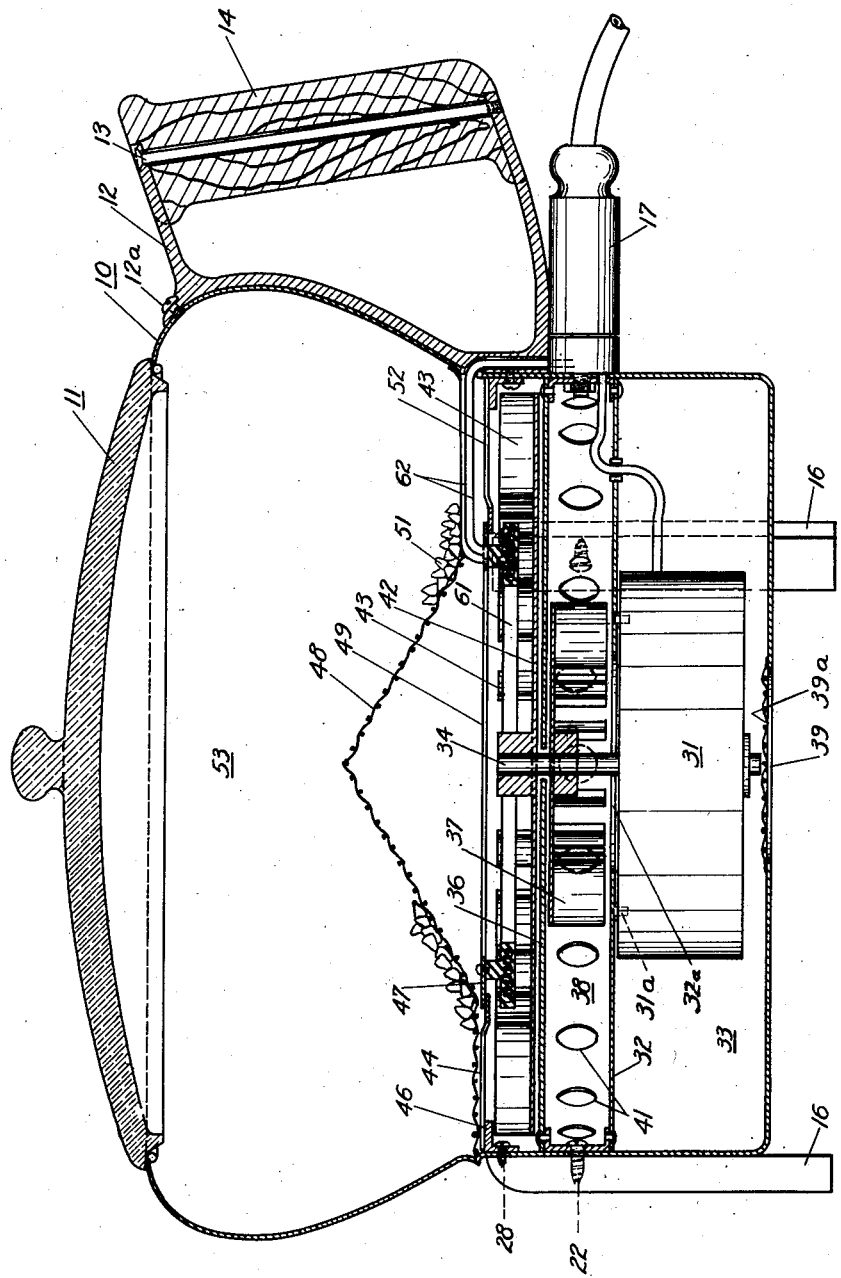
INVENTOR.
IRVEN H. WILSEY
BY Flournoy Corey,
ATTORNEY Patented May 13, 1941

2,241,754

UNITED STATES PATENT OFFICE 2,241,754

APPARATUS FOR POPPING CORN

Irven H. Wilsey, Chicago, Ill.

Application March 24, 1938, Serial No. 197,843

7 Claims. (Cl. 53—4)

This invention relates to apparatus for popping corn and has particular relation to batch popping devices suitable for home use.

Although the invention I am about to describe may be applied to automatic corn popping devices, I am at this time particularly interested in mechanisms of the so-called "home popper" type in which a limited number of batches are popped for home consumption.

Devices of this character now known to the art comprise heated plates on which the corn is placed and the corn stirred by means of a rod or the like, or devices in which the heated plate is moved by some outside means to prevent sticking and scorching of the corn.

These devices have the marked disadvantage of heating the corn at only one point or a few points, so that, in popping, rupture of the kernel occurs at this point and the kernel of popped corn is small and hard.

Other disadvantages of the devices of the prior art are that some of the parts of the popper attain a high temperature and other parts will be at a low temperature, which makes the control of the popping operation extremely difficult. Other disadvantages of devices of the prior art are that regulation of moisture within the chamber is difficult.

A general object of my invention is to provide corn popping devices in which the entire kernel is uniformly heated.

Another object of my invention is to provide a portable corn popper in which varied air currents are set up to maintain all the interior parts of the popper at a uniform temperature.

Another object of my invention is to provide a portable corn popper in which forced air currents distribute the heat uniformly over the entire popping chamber masses, so that in normal room temperature a predetermined average temperature is maintained within the chamber.

Another object of my invention is to provide a portable popping chamber in which some of the released moisture from the corn is employed to increase the specific heat and the pressure of the gas in which the corn is being popped.

Another object of my invention is to provide a corn popper in which the rate of heat transfer may be increased by increasing the moisture content.

Other and further features and objects of the invention will be more apparent to those skilled in the art upon a consideration of the accompanying drawing and following specifications, wherein is disclosed an exemplary embodiment of the invention, with the understanding, however, that such changes may be made therein as fall within the scope of the appended claims, without departing from the spirit of the invention.

In said drawing:

The single figure thereof is a view in section of a device constructed according to a preferred embodiment of my invention.

Referring now to the drawing:

A corn popper constructed according to one embodiment of my invention has a pan-like shell, indicated generally at 10, and preferably flared at the walls of the upper portion thereof. A flattened dome-like cover 11 which may be of metal, glass or Bakelite, is adapted to close the top of the shell or base 10. A handle 12 is secured to the shell by means of screws 12a, and a grip 14 is secured within the handle by means of a through bolt 13. Legs 16, which preferably are wooden strips, are secured to the outer wall of the lower portion of the shell by means of screws 22 and 28. Electrical energy for energizing the motor and heating element, later described, is introduced into the popper by means of the outlet 17.

In practicing my invention I employ a blower means for circulating air through the popping chamber, and a heating element for heating the air so circulated. A suitable motor for this purpose is indicated at 31, and this motor is secured by means of screws 31a to a partition 32 within the chamber 33 formed by this partition 32 and the bottom of the shell. The shaft 34 of the motor projects upwardly through a second partition 36. A fan 37 is secured on the shaft 34 of the motor within the chamber 38 between the partitions 32 and 36 and air for cooling the motor is drawn in through the opening 39 in the bottom of the popper, passes upwardly through the motor, through an opening 32a in partition 32, and through the fan 37 and is discharged through the openings 41 in the side wall of the shell. The opening 39 is preferably covered by means of a screen 39a.

A disk 42 is fastened on the upper end of the shaft 34 and this disk is provided with blower blades 43 on the upper face thereof. A washer-like partition 44 is provided above the blower blades 43 and this washer-like member is supported by a circular flange 46. Another washer 47 is supported on the inner edge of the washer-like member 44. A cone-shaped screen 48 is provided above the large opening 49 provided by the ring 47 and this screen acts as a support for the raw kernels of corn 51. Openings are provided in the ring 44, as indicated at 52, and these openings permit air to be drawn from the chamber 53 in the upper part of the shell down through the openings 52 in toward the center of the chamber in which the blower is located and up through the opening 49 an the cone 48. Air may thus be circulated by the blower through the chamber 53.

The ring 47 supports a "doughnut" type heater element 61, the electrical energy for which comes into the heater element through the conductors 62. It is now apparent that if corn is placed on the cone-shaped screen 48, and the motor and the heater energized, air will be drawn from the chamber 53 into the blower chamber and will be then forced upwardly through the cone, passing over the heater element 61 and that the air in the chamber 53 will be recirculated over and over. Each time the air passes over the heater its temperature is increased until finally the heat losses equal the heat supplied. The heating capacity of the heater is such that the air in the inside of the popper reaches a temperature of approximately 425 degrees and is maintained at this temperature so long as the heater and motor are energized.

As the corn begins popping moisture is released. The released moisture increases the specific heat of the gas in which the corn is being popped. Also the moisture increases the heat conductivity of the gas in which the corn is being popped to thus materially facilitate the popping operation and to condition the corn not yet popped by toughening the outer shell.

Although I have described a specific embodiment of my invention, it is apparent that modifications thereof may be made by those skilled in the art. Such modifications may be made without departing from the spirit and scope of my invention as set forth in the appended claims.

I claim as my invention:

1. In a popper, a shell having partitions therein to divide the interior thereof into a plurality of chambers, a motor in one chamber, a blower in another chamber, a second blower in still another chamber and means for supporting corn in a fourth chamber in such a manner that the motor drives the blowers which in turn drive air into the chambers.

2. In a popper, a shell having partitions therein to divide the interior thereof into a plurality of chambers, a motor in one chamber, a blower in another chamber, a second blower in still another chamber, means for supporting corn in a fourth chamber, and the partitions between the blower chambers and the corn and motor chamber being provided with passageways for the circulation of air between the last named chambers and around the corn and motor, said circulation being set in motion by the motor driven blowers.

3. In a popper, a shell-like member having an opening in the bottom thereof, a partition above the bottom of the chamber, a motor secured beneath the partition, a second solid partition above the first, a blower above the second partition, a third partition including a screen disposed above the blower, and a heater below the screen and adjacent to the blower, whereby air forced by the blower will pass over the heater and will be directed up through the screen.

4. In a popper, a pan-like shell having partitions therein to divide the interior thereof into a plurality of chambers, a motor in one chamber, a blower in another chamber, a second blower in yet another chamber together with a heating element, and a means for supporting corn in a fourth chamber, the first blower being so disposed as to cool the motor, the second blower being so disposed as to direct air over the heating element and into the corn popping chamber.

5. In a popper, a shell having partitions therein to divide the interior thereof into horizontal chambers, a motor in the lower or first chamber, a partition between the lower chamber and the second chamber so perforated as to allow a passage of air through the bottom and side of said chamber, a blower in said second chamber which is so arranged as to draw air from the first or lower chamber and expel said air through the side of said second chamber, a partition between the second and third chambers so disposed as to completely prevent movement of air between said chambers, a blower in said third chamber, said blower driven by the motor in the first chamber, and a partition between the third and fourth chambers perforated in the center and at the outer edge in such a manner as to allow the blower in the third chamber to create a circulation of air between the third and fourth chambers.

6. In a popper, a pan-like shell divided into a plurality of chambers and with an opening in the bottom thereof, a means for heating air, motor driven means for the circulation of the heated air through the chamber in which the corn is to be popped, and means for cooling said motor driven means by use of a secondary air circulating system through the remaining chambers.

7. In a popper, a pan-like shell, a motor mounted for rotation about a vertical axis within the shell, two blowers mounted upon the motor shaft, a heating element, a chamber for corn, said heating element being mounted within one of the blowers so that the air from the blower is heated before passing into the corn chamber, the other blower being mounted adjacent the motor to cool the motor.

IRVEN H. WILSEY.